Dec. 10, 1963     H. J. SCHWERDHÖFER     3,113,472
MULTIPLE SPEED HUB ARRANGEMENT
Filed May 23, 1961     4 Sheets-Sheet 1

INVENTOR
Hans Joachim Schwerdhöfer
By Richard Ernst
Agt

Dec. 10, 1963 H. J. SCHWERDHÖFER 3,113,472
MULTIPLE SPEED HUB ARRANGEMENT
Filed May 23, 1961 4 Sheets-Sheet 2

INVENTOR
Hans Joachim Schwerdhöfer
By
Richard End
Agt

Dec. 10, 1963    H. J. SCHWERDHÖFER    3,113,472
MULTIPLE SPEED HUB ARRANGEMENT
Filed May 23, 1961    4 Sheets-Sheet 3

INVENTOR
Hans Joachim Schwerdhöfer
By Richard Graf
Agt

Dec. 10, 1963  H. J. SCHWERDHÖFER  3,113,472
MULTIPLE SPEED HUB ARRANGEMENT
Filed May 23, 1961  4 Sheets-Sheet 4

INVENTOR
Hans Joachim Schwerdhöfer

United States Patent Office 3,113,472
Patented Dec. 10, 1963

3,113,472
MULTIPLE SPEED HUB ARRANGEMENT
Hans Joachim Schwerdhöfer, Schweinfurt (Main), Germany, assignor to Fichtel & Sachs A.G., Schweinfurt (Main), Germany, a corporation of Germany
Filed May 23, 1961, Ser. No. 111,963
Claims priority, application Germany May 27, 1960
3 Claims. (Cl. 74—750)

This invention relates to power transmission, and more particularly to multiple speed hub arrangements of the type commonly employed in bicycles, motorcycles, and other vehicles.

Because of the special requirements of the field of application in which such hub arrangements have their greatest utility, it is important that they be light in weight, yet rugged and dependable in use with a minimum of maintenance. It is also desirable that the hub arrangement be composed of a minimum of movable parts, and that these parts be inexpensive to manufacture. It is very important that the hub be small in diameter and of short length. Yet, the hub should accommodate a power transmission having at least three speeds, and leave room for a coaster brake. It is the object of this invention to provide a hub arrangement which meets the above requirements in a most favorable manner.

The hub arrangements with which this invention is concerned, are basically known. They include a hub shell from which the spokes of a wheel may radiate, so that movement of the wheel is actuated when the hub shell is rotated. A sprocket coaxial with the hub shell is engaged by a drive chain and transmits the power of a person riding the bicycle, or of an engine driving the motorcycle to a multiple speed transmission arranged in the hub shell. The transmission drives the hub shell at a speed which may be varied.

The multiple speed hub arrangement of my invention is of the aforedescribed type. My multiple speed transmission includes a speed changing gear arranged in the hub shell. The gear has two elements which are connected to each other for joint rotation at different speeds. Two coupling members in the hub are respectively connected to the hub shell and the sprocket respectively for joint movement. Means are provided for selectively engaging each coupling member with each one of the two gear elements, so that three speeds are available. The hub shell rotates at the same speed as the sprocket when both coupling members are engaged with the same gear elements, and a lower and a higher transmission ratio are obtained when the coupling members are engaged with different gear elements in the two possible combinations.

Other features and many of the attendant advantages of this invention will be readily appreciated as the same becomes better understood by reference to the following detailed description when considered in connection with the accompanying drawings, in which like reference numerals designate like parts throughout the figures thereof, and wherein.

Figure 1:
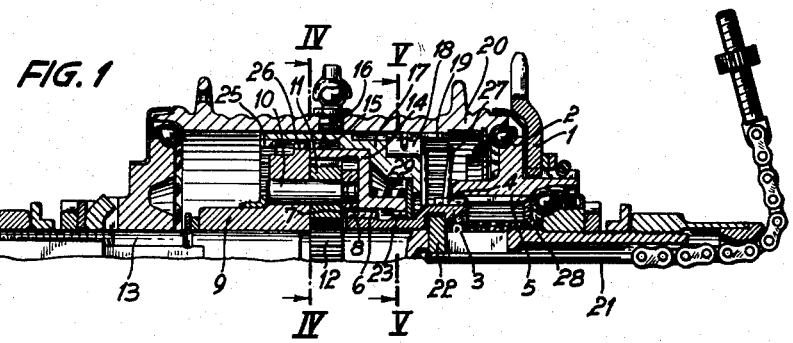
FIG. 1 shows a preferred embodiment of the multiple speed hub of the invention in axial section, one half of the hub only being shown.
Figure 2:
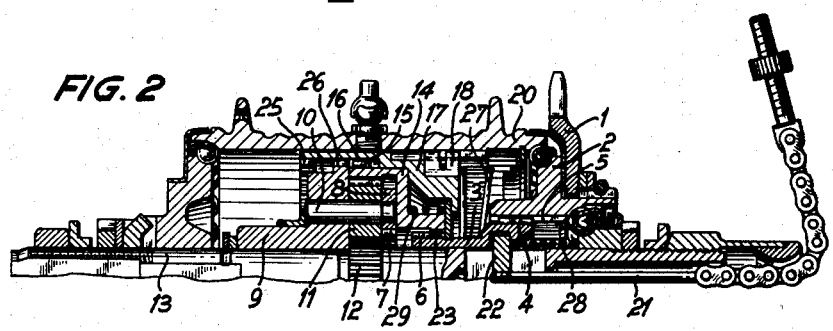
FIG. 2 shows the hub of FIG. 1 as set for a different transmission ratio.
Figure 3:
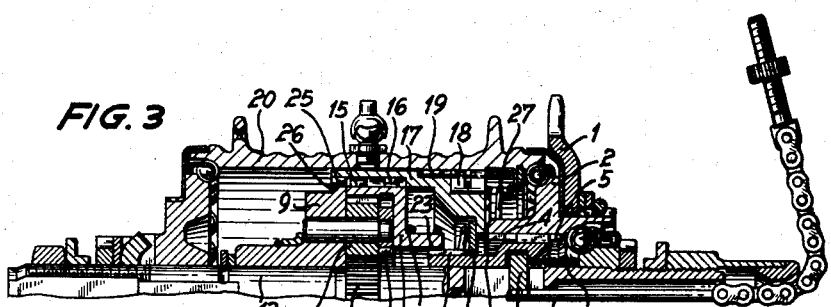
FIG. 3 shows the same hub set for a third transmission ratio.
Figure 9:
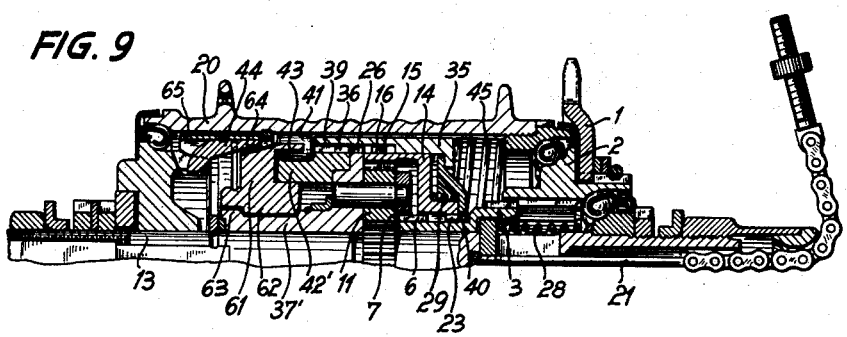
Figure 10:
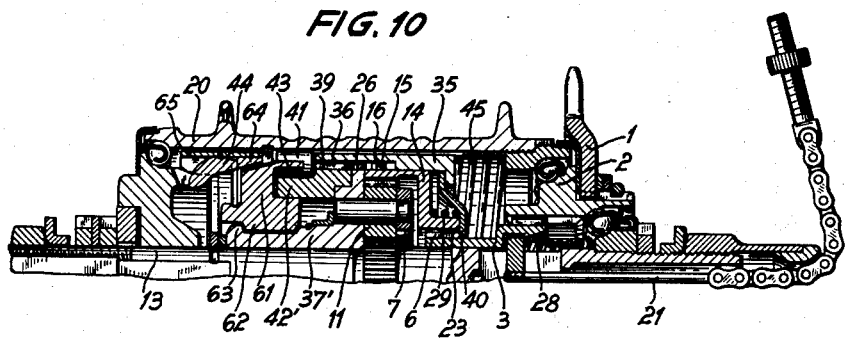
Figure 11:
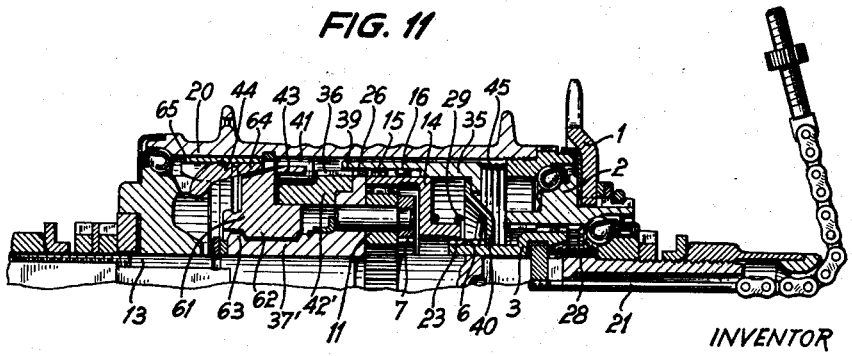
Figure 12:
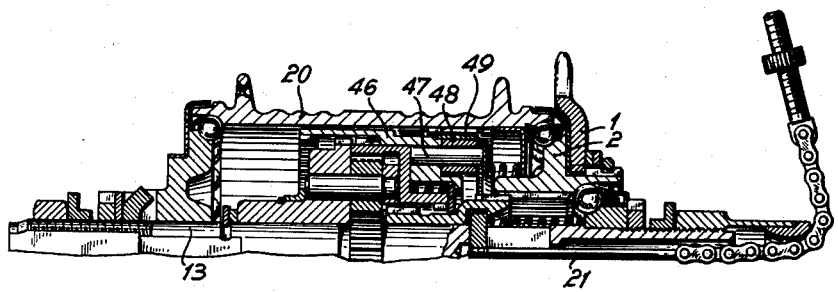

FIGS. 9, 10, and 11 show a three-speed hub of the invention equipped with a coaster brake, the three views respectively illustrating operating positions of the hub corresponding to those of FIGS. 1, 2, and 3; and FIG. 12 illustrates yet another modified embodiment of the invention.

Figure 4:
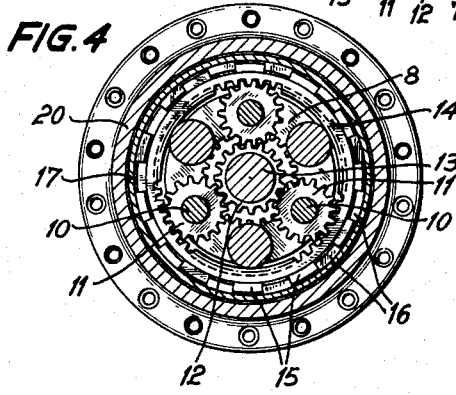
FIG. 4 is a radially sectional view of the hub of FIG. 1 taken on the line IV—IV.
Figure 5:
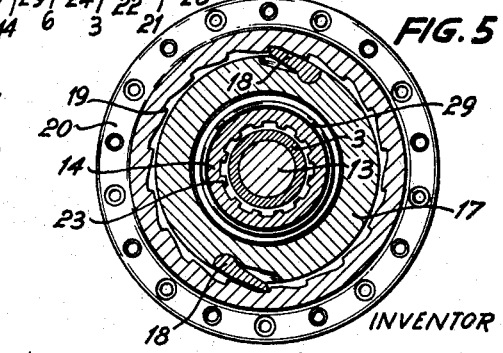
FIG. 5 shows the hub of FIG. 1 in radial section on the line V—V.

Referring now to the drawing in more detail, and initially to FIGS. 1 to 5, there is shown a three-speed hub for a bicycle. FIG. 1 shows the hub set for high speed, FIG. 2 for intermediate speed, and FIG. 3 for low speed. The radially sectional views of FIGS. 4 and 5 are consistent with each of FIGS. 1 to 3.

The hub, which is of conventional outward appearance, is equipped with conventional means for attaching it to the frame of a vehicle and with attachments for the wire spokes of a wheel. These elements which are not in themselves part of this invention are shown in the drawing, but do not require more detailed description.

The hub receives motive power by means of a chain (not shown) and a sprocket 1 which is fastened to a driver member 2. The latter is rotatable on the stationary shaft 13 of the hub. The driver member 2 has a central opening in which a coaxial coupling sleeve 3 is axially slidable. The sleeve 3 is driven by the driver member 2. Axially elongated teeth 5 in the central opening of the driver member 2 mesh with corresponding external teeth 4 on the coupling sleeve 3 in all axial positions of the latter.

A second set of teeth 6 on the sleeve 3, axially spaced from the teeth 4, meshes with an internal toothed rim 7 of a coaxial ring 8 when the hub is set for high speed in the manner shown in FIG. 1. The ring is mounted on the free ends of pins 10 which are eccentrically distributed about the axis of the carrier or spider member 9 of a planetary gear. The pins 10 each carry a planet pinion 11. The pinions engage a stationary sun wheel 12 centrally mounted on the shaft 13 and an internally geared wheel 14. The wheel 14 thus rotates about the shaft 13 at a higher speed than the spider member 9.

Broad teeth 15 on the outer cylindrical face of the wheel 14 are in engagement with similarly shaped internal teeth 16 of an axially slidable coaxial coupling member 17. This coupling member which transmits the torque of the planetary gear transmission to the hub shell under all conditions of operation, will hereinafter be referred to as the "driving coupling member" to differentiate it from the driven coupling sleeve 3.

As better seen in FIG. 5, spring loaded pawls 18 are circumferentially mounted on the driving coupling member 17 and cooperate with a ratchet ring 19 which is integral with or fixedly fastened on the hub shell 20. The pawls 18 and the ratchet 19 connect the driving coupling member 17 to the hub shell 20 for joint rotation in all axial positions of the coupling member. Depending on the speed set, the pawls cooperate with different, axially spaced portions of the ratchet.

The hub is shifted from one speed to the other by means of a pull rod 21 which is moved outwardly of the hub by a chain and other tension members in a manner well known in itself. The pull rod 21 is attached to a sliding block 22 which engages a conforming recess in the driven coupling sleeve 3.

As seen in FIG. 2, the hub is in its intermediate speed position. The rod 21, the sliding block 22, and the driven coupling sleeve 3 are displaced outward of the hub as compared to their respective positions in FIG. 1. The teeth 6 on the sleeve 3 no longer engage the internal toothed rim 7 on the ring 8 for driving engagement with the spider 9, but they engage an internal toothed rim 23 on the wheel 14 of the planetary gear. Nothing has been changed in the relative positions of the wheel 14 and the driving coupling member 17, and their teeth 15 and 16 continue to be engaged. The teeth 6 of the sleeve 3 axially abut against a movable disc 24 which is backed by the abutting driving coupling member 17.

In the position of the hub arrangement illustrated in FIG. 3, the rod 21, the block 22, and the sleeve 3 have been further displaced outward of the hub shell 20. The pressure of the abutting teeth 6 of the sleeve 3 has displaced the disc 8 and the disc has transmitted the movement of the sleeve 3 to the driving coupling member 17 so that the teeth 15 and 16 of the wheel 14 and of the coupling member 17 are no longer engaged. The coupling member 17 is in motion transmitting engagement with the spider member of the planetary gear transmission by the engagement of broad internal teeth 25 on the coupling member 17 with corresponding external teeth 26 on the spider member 9.

In all the three speed positions of the hub illustrated in FIGS. 1 to 3, driving power is transmitted from the sprocket 1 to the driven coupling sleeve 3 by means of the driver member 2. Equally, power is transmitted in all speed positions from the coupling member 17 to the hub shell 20 as long as the power is applied in a forward direction. The pawls 18 act as a freewheeling clutch and permit freewheeling in the usual manner when the hub shell moves faster than the coupling member 17.

At the highest speed, as shown in FIG. 1, the driven coupling sleeve 3 is connected with the slower moving spider member 9, and the driving coupling member 17 is connected with the faster moving internally geared wheel 14 of the planetary gear. At the intermediate speed, in the position illustrated in FIG. 2, both the driven coupling sleeve 3 and the driving coupling member 17 are connected to the same element of the planetary gear, namely the wheel 14. In the slowest speed position shown in FIG. 3, the connections of FIG. 1 are interchanged: the driven sleeve 3 is connected to the faster moving wheel 14, and the driving coupling member 17 to the slower moving spider member 9.

Shifting from a lower to a higher speed is initiated by relaxing the tension on the rod 21. A powerful return spring 28 urges the block 22 and the rod 21 inward of the hub. A second strong spring 27, one end of which abuts against the coupling member 17, whereas the other end abuts against a portion of the hub shell 20 biases the coupling member 17 in the same direction. A third, weaker, spring 29 is interposed between the wheel 14 and the disc 24. It holds the wheel 14 in its fixed axial position of engagement with the other axially stationary members of the planetary gearing, and it maintains contact between the disc 24 and the coupling member 17.

During shifting from low to intermediate speed, the spring 28 moves the coupling sleeve 3 and its teeth 6 far enough to permit the driving coupling member 17 to slide into a position of axial abutment against the wheel 14 or other axially stationary elements of the hub arrangement under the urging of the spring 27. During the shifting of the coupling sleeve 3 from intermediate to high speed, the driving coupling member 17 is not further displaced in an axial direction.

Figure 6:
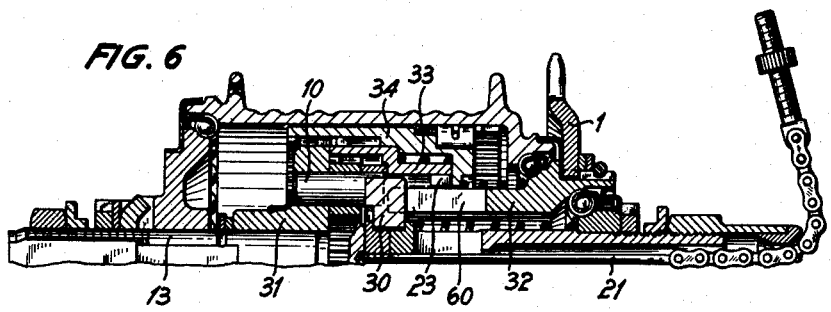
FIG. 6 illustrates another three-speed hub of the invention in axial section.

The embodiment of the invention illustrated in FIG. 6 differs from that shown in FIGS. 1 to 5 by details of the motion transmitting elements interposed between the sprocket 1 and the spider member 31 of the planetary gearing. The driver member 32 which is fixedly fastened to the sprocket 1 is provided with a plurality of circumferentially spaced axial extensions 60 on which a ring 30 is axially slidable while being connected to the driver member 32 for joint rotation. In the high-speed position of the hub arrangement seen in FIG. 6, the axial openings in the ring 30, which also receive the extensions 60, are engaged by the free ends of the pins 10 on the spider member 31 which is not equipped with a gear ring 8 in the manner of FIGS. 1 to 5.

In the intermedate and slow speeds, the ring 30 is withdrawn from axial engagement with the pins 10. The ring 30 is equipped with an external toothed rim which in the slower speeds meshes with the internal toothed rim on the wheel 23 which is analogous to the afore-described wheel 14 although its shape is modified to accommodate the extensions 60 and permit movement of the ring 30 thereon.

In all other respects, the hub of FIG. 6 is substantially identical with that shown in FIGS. 1 to 5, and it operates in the same manner.

Figure 7:
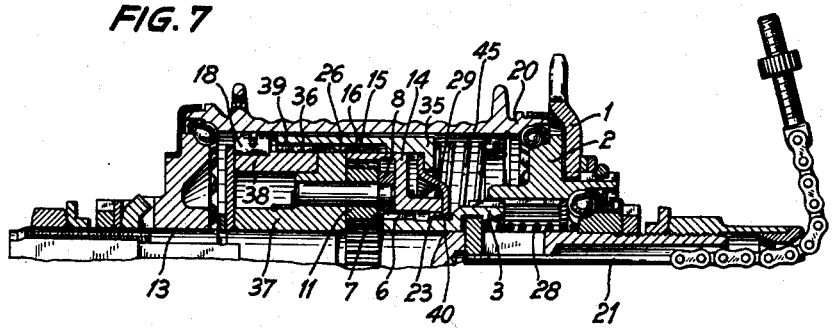
FIG. 7 shows another embodiment of the invention in a view corresponding to that of FIG. 1.

The apparatus shown in FIG. 7 differs from that illustrated in the aforedescribed figures mainly in the elements transmitting power from the planetary gear to the hub shell 20. The driving coupling member 35 is axially movable from the illustrated high speed position by abutment of the teeth 6 on the driven coupling sleeve 3 against a disc 40. The coupling member 35 does not directly transmit power to the hub shell 20, but it carries internal teeth 39 which engage a mating external toothed rim 36 on a tubular pawl carrier member 38. The latter is rotatable on the spider member 37 the shape of which is modified from that of the spider member 9 to provide a bearing surface for the pawl carrier 38. The pawl carrier 38 has the pawls 18 mounted thereon for engagement with the hub shell 20.

When set for high speed, the hub shown in FIG. 7 operates as follows:

The coupling sleeve 3 actuates rotation of the spider member 37 by means of teeth in the manner described above. The planet pinions 11 drive the wheel 14 which is connected to the driving coupling member 35 by the broad teeth 15 and 16. The coupling member 35 is in engagement with the pawl carrier 38 which in turn drives the hub shell 20 by means of the pawls 18.

When the coupling sleeve 3 is shifted to its medium speed position, it moves axially out of engagement with the spider member 37 and its teeth 6 engage the internal toothed rim 23 on the wheel 14. Power is transmitted from the wheel 14 to the hub shell 20 in the same manner as described in the preceding paragraph. The planet pinions 11 idle.

Further shifting of the driven coupling sleeve 3 into its slow speed position does not alter the power transmission train between the sprocket 1 and the wheel 14. The driving coupling member 35 is moved axially by the disc 40 until its teeth 16 lose contact with the teeth 15 of the wheel 14, and the axially elongated teeth 39 of the coupling member 35 engage the external teeth 26 on the spider member 37 without disengaging from the toothed rim 36 of the pawl carrier 38. While the driven coupling sleeve 3 is now connected to the faster moving wheel 14 of the planetary gear, the driving coupling member 35 is connected to the slower moving spider member 37.

Figure 8:
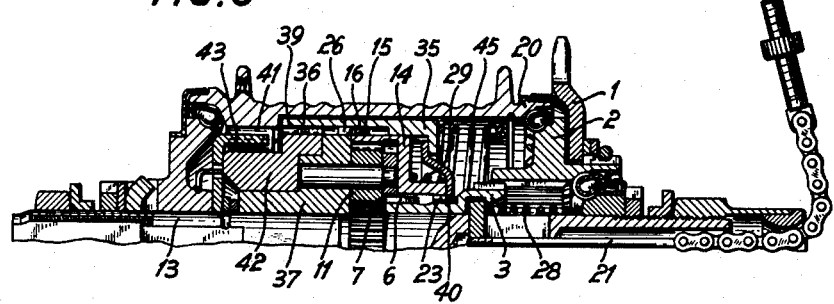
FIG. 8 illustrates a modification of the hub arrangement of FIG. 7.

The modified hub arrangement of FIG. 8 is very similar to that of FIG. 7 and basically functions in the same manner, but the pawl-and-ratchet drive of the hub shell 20 in the afore-described embodiments of the invention has been replaced by a grip roller clutch, well known in itself, which permits freewheeling in the same manner but is somewhat quieter than the ratchet arrangement. The pawl carrier 38 of the apparatus of FIG. 7 is thus replaced by a driving member 42 rotation of which is actuated by the driving coupling member 35 in the above-described manner. When driven in the forward direction, the driver member 42 urges the rollers 41, which are guided in a cage 43, against the hub shell 20, while permitting free rotation of the shell if it moves faster than the driver member.

FIGS. 9 to 11 show a hub arrangement basically similar to that of FIG. 8, but equipped with a coaster brake 44. FIG. 9 shows the hub in the high speed position, FIG. 10 in the intermediate speed position, and FIG. 11 in the low speed position. The power transmission train from the sprocket 1 to the hub shell 20 during forward movement of the sprocket is substantially the same, and it operates in the same manner as that shown in FIG. 8 in all speeds, and a more detailed description will not be required by those skilled in the art.

The driving member 42' of the grip roller clutch is somewhat modified to provide space for a brake block 61 which has a conical outer face and a cylindrical inner face. The spider member 37' is also somewhat modified and has a cylindrical face opposite that of the brake block 61. The cylindrical faces carry respective engaged threads 62, 63 which cause the brake block 61 normally to abut against an axially fixed member such as the driver member 42' as shown in FIGS. 9 to 11. When the sprocket 1 is turned backwards by reverse pressure on the pedals of the bicycle, the threaded engagement of the spider member 37' and of the brake block 61 causes the block to move toward the left, as viewed in FIGS. 9 to 11. Its conical face is axially urged against a corresponding internal face of an axially slotted or divided brake conus 64. The resulting radial expansion of the conus 64 forces a friction sleeve 65 against the hub shell 20 and brakes the movement of the latter.

FIG. 12 shows a further modification of the hub of FIG. 1. It is equipped with pawls 48 which are mounted on pins 47. The pins are press fitted in a driving-coupling member 46 which is alternately engageable with the spider member and the internally geared wheel of the planetary gear of the hub, as has been described above in more detail in connection with FIGS. 1 to 11. A single pawl-and-ratchet arrangement transmits power to the hub shell 20 in all speed positions. The pawls therefore do not generate noise and the hub operates practically without an audible sound. To maintain noiseless operation during freewheeling, the pawls are arranged to be radially retracted by an arrangement known in itself. A friction sleeve 49 is provided for this purpose. It operates in the manner more fully described in the German Patent No. 1,043,121. When the hub shell 20 rotates faster than the coupling member 46, the friction sleeve or ring urges the portions of the pawls which engage the ratchet teeth of the hub shell 20 to move radially inward. Another device which may be employed to inactivate the pawls of my hub arrangements has been disclosed in German Patent No. 741,943. When retractable pawls are used, a hub arrangement of this invention equipped with a pawl-and-ratchet connection between the planetary gear and the hub shell can be made to operate completely without noise.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What I claim is:
1. In a multiple speed hub arrangement for a bicycle and the like, in combination, hub shell means; a driven coupling member axially movable in said hub shell means; driving means for actuating rotation of said driven coupling member; a speed changing gear in said hub shell means, said gear including first and second members operatively connected for joint rotation at different speeds; speed changing means for axially moving said driven coupling member in said hub shell means between a first axial position in which said coupling member is in driving engagement with said first member, and second and third axial positions in which said coupling member is in driving engagement with said second member; a driving coupling member axially movable in said hub shell means; connecting means for connecting said driving coupling member to said hub shell means for joint rotation therewith; and motion transmitting means interposed between said coupling members, said motion transmitting means being selectively responsive to movement of said driven coupling member between said second and third positions thereof for axially moving said driving coupling member between respective positions in which said driving coupling member engages said first and said second member; said connecting means including an engaging member mounted on said driving coupling member and engageable with a plurality of axially spaced portions of said hub shell means for actuating rotation of said hub shell means when said driving coupling member is in the several axial positions thereof.

2. In a multiple speed hub arrangement for a bicycle and the like, in combination, a hub shell; a driven coupling member axially movable in said hub shell; driving means for actuating rotation of said driven coupling member; a planetary speed changing gear axially fixed in said hub shell, said gear including a fixed sun wheel, a rotatable spider member coaxial with said sun wheel, a planet pinion on said spider member and meshing with said sun wheel, and an internally geared wheel in meshing engagement with said pinion; speed changing means for axially moving said driven coupling member in said hub shell between a first axial position in which said coupling member is in driving engagement with said spider member, and second and third axial positions in which said coupling member is in driving engagement with said internally geared wheel; a driving coupling member axially movable in said hub shell; connecting means for connecting said driving coupling member to said hub shell for joint rotation therewith; motion transmitting means interposed between said coupling members, said motion transmitting means being selectively responsive to movement of said driven coupling member between said second and third positions thereof for axially moving said driving coupling member between respective positions in which said driving coupling member engages said spider member and said internally geared wheel respectively; and coaster brake means in said hub shell and engageable therewith when said driving means actuates rotation of said driven coupling member in a predetermined direction, said connecting means including freewheeling clutch means selectively effective to transmit the movement of said driving coupling member to said hub shell when said driven coupling member is rotated in a direction opposite to said predetermined direction only.

3. In a multple speed hub arrangement for a bicycle and the like, in combination, a hub shell; a driven coupling member axially movable in said hub shell; driving means for actuating rotation of said driven coupling member; a planetary speed changing gear axially fixed in said hub shell, said gear including a fixed sun gear wheel, a rotatable spider member coaxial with said sun wheel, a planet pinion on said spider member and meshing with said sun wheel, and an internally geared wheel in meshing engagement with said pinion; speed changing means for axially moving said driven coupling member in said hub shell between a first axial position in which said coupling member is in driving engagement with said spider member, and second and third axial positions in which said coupling member is in driving engagement with said internally geared wheel; a tubular driving coupling member axially movable in said hub shell, said driving coupling member defining a central cavity, said planetary gear extending in said cavity, said driving coupling member being formed with tooth means in said cavity for selective engagement with said spider member and with said internally geared wheel respectively; connecting means for connecting said driving coupling member to said hub shell for joint rotation therewith; and motion transmitting means responsive to movement of said driven coupling member between said second and third positions thereof for axially moving said driving coupling member between respective positions in which the tooth means on said driving coupling member engages said spider member and said internally geared wheel respectively.

References Cited in the file of this patent

UNITED STATES PATENTS

| | | |
|---|---|---|
| 753,785 | Archer | Mar. 1, 1904 |
| 2,844,050 | Brendel | July 22, 1958 |
| 2,854,108 | Douglas | Sept. 30, 1958 |
| 3,021,728 | Shimano | Feb. 20, 1962 |

FOREIGN PATENTS

| | | |
|---|---|---|
| 701,437 | Germany | Jan. 16, 1941 |
| 765,236 | Germany | Oct. 5, 1950 |
| 833,564 | Great Britain | Apr. 27, 1960 |